United States Patent [19]

Brantley, Jr.

[11] Patent Number: 4,792,908
[45] Date of Patent: Dec. 20, 1988

[54] METHOD FOR CONTROLLING THE MOONEY VISCOSITY OF COMPOUNDED RUBBER FORMULATIONS

[75] Inventor: Herbert L. Brantley, Jr., Akron, Ohio

[73] Assignee: The Firestone Tire & Rubber Company, Akron, Ohio

[21] Appl. No.: 843,534

[22] Filed: Mar. 25, 1986

[51] Int. Cl.$^4$ ............................................. G06F 15/46
[52] U.S. Cl. .................................... 364/473; 523/303; 524/575
[58] Field of Search ........................ 364/473; 524/575; 523/303

[56] References Cited

U.S. PATENT DOCUMENTS

| 3,795,651 | 3/1974 | Yamaguchi et al. | 524/474 |
| 4,371,483 | 2/1983 | Mattson | 364/473 |
| 4,515,008 | 5/1985 | Matsushita et al. | 73/53 |
| 4,542,466 | 9/1985 | Arimatsu | 364/473 |
| 4,546,438 | 10/1985 | Prewitt et al. | 354/473 |
| 4,551,807 | 11/1985 | Hsich et al. | 364/473 |
| 4,589,072 | 5/1986 | Arimatsu | 364/473 |

OTHER PUBLICATIONS

Berry et al., "Assessment of Rubber Processability"--Plastics and Rubber: Processing, Sep., 1977.
Koopman et al., "Improvement of Standard Rheological Tests for Better Material Characterization"-presented at the ASTM D-11 Processibility Symposium, Toronto/Ont., Canada, Jun. 21, 1982.

Primary Examiner—Jerry Smith
Assistant Examiner—John R. Lastova
Attorney, Agent, or Firm—Daniel N. Hall

[57] ABSTRACT

A method for obtaining a vulcanizable rubber formulation of controlled uniform viscosity properties containing synthetic rubber comprises the steps of determining the Mooney viscosity, $MV_a$, of the synthetic rubber from which the formulation is to be prepared; determining the relaxation time, $T_{80}$, of the synthetic rubber from which the formulation is to be prepared; calculating from $MV_a$ and $T_{80}$ the Mooney viscosity, $MV_b$, of the compounded rubber formulation; selecting synthetic rubber having $MV_a$ and $T_{80}$ values within a predetermined range of values calculated to produce a compounded rubber formulation, the $MV_b$ of which is within a desired, preselected uniform range; and, compounding the selected synthetic rubber with carbon black and other conventional rubber compounding agents to produce the rubber formulation of $MV_b$ within the predetermined range of values. A method is also provided for predicting the Mooney viscosity $MV_b$ of a vulcanizable rubber stock containing styrene-butadiene rubber.

12 Claims, 1 Drawing Sheet

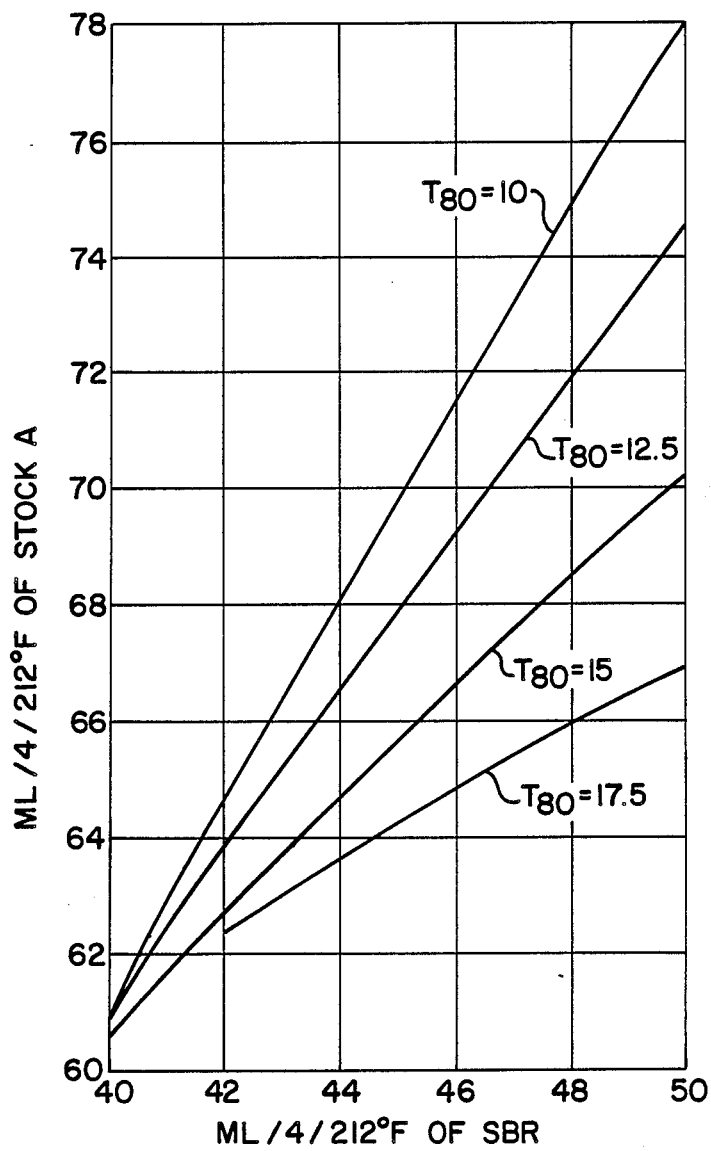

METHOD FOR CONTROLLING THE MOONEY VISCOSITY OF COMPOUNDED RUBBER FORMULATIONS

TECHNICAL FIELD

The present invention provides a method for obtaining vulcanizable rubber compositions having improved processability. Generally, processing problems that are encountered during the processing of rubber products, particularly tires and their component elements, are due to variables inherent in polymer characteristics namely, molecular weight and the distribution thereof. The invention set forth herein is particularly useful for the compounding of tire tread compositions and employs the steps of determining the Mooney viscosity and stress relaxation time of the raw polymer as a means of obtaining a rubber composition having good processability.

BACKGROUND ART

Rubber compositions usable in tire treads and having improved processability have been described in U.S. Pat. No. 3,795,651. The composition comprises at least 30 percent by weight of styrene-butadiene random copolymer which has a Mooney viscosity of from 40 to 150 and a relaxation time of from 20 to 200 seconds at 100° C. at a viscometer rotor rate of 2 rpm. The relaxation time is defined as the time following normal measurement of the Mooney viscosity for the viscometer reading to reach a value of 20 percent of the Mooney viscosity value immediately prior to stopping the viscometer rotor.

An article appearing in *Plastics and Rubber: Processing* (September, 1977) entitlted "Assessement of rubber processability" noted that evidence exists to establish that processing problems in rubber products arise directly from variability in raw polymer characteristics, particularly molecular weight and the distribution thereof. Upon testing raw natural rubber, it was reported that Mooney viscosity was related to the weight average molecular weight while relaxation time was related to the molecular weight distribution.

Notwithstanding the foregoing art, until the present invention it has not been known to utilize stress relaxation time of a raw polymer to determine and control the Mooney viscosity of the rubber compound which, in turn, reduces variation in the processability of the compound.

DISCLOSURE OF THE INVENTION

The subject invention is directed toward a method for obtaining a vulcanizable rubber formulation of controlled uniform viscosity properties containing synthetic rubber which compriss the steps of determining the Mooney viscosity, $MV_a$, of the synthetic rubber from which the formulation is to be prepared; determining the relaxation time, $T_{80}$, of the synthetic rubber from which the formulation is to be prepared; calculating from $MV_a$ and $T_{80}$ the Mooney viscosity, $MV_b$, of the compound rubber formulation; selecting synthetic rubber having $MV_a$ and $T_{80}$ values within a predetermined range of values calculated to produce a compounded rubber formulation, the $MV_b$ of which is within a desired, preselected uniform range; and, compounding the selected synthetic rubber with carbon black and other conventional rubber compounding agents to produce the rubber formulation of $MV_b$ within the predetermined range of values.

A method is also provided for predicting the Mooney viscosity (ML/4 at 212° F.), $MV_b$, of a vulcanizable rubber stock containing styrene-butadiene rubber comprising the steps of determining the Mooney viscosity, $MV_a$, of the raw SBR; determining the relaxation time, $T_{80}$, of the raw SBR at 212° F. until the raw SBR has reached 20 percent of its original Mooney viscosity; and, calculating the Mooney viscosity, $MV_b$, of the rubber stock compound according to the expression:

$$V_b = a_o + a_1 x_1 + a_2 x_2 a_{11} x_1^2 + a_{22} x_2^2 + a_{12} x_1 x_2$$

where
- $MV_b$ = ML/4 @212;20 F. of the final compound at 0.085 KWH/lb of mixing energy
- $x_1 = T_{80}$ of SBR
- $x_2$ = ML/4 @212° F. of SBR ($MV_a$)
- $a_o = -83.48$
- $a_1 = 5.34$
- $a_2 = 4.11$
- $a_{11} = 0.026$
- $a_{22} = -0.01$
- $a_{12} = -0.15$.

BRIEF DESCRIPTION OF THE DRAWING

The drawing FIGURE is a graph depicting Mooney viscosity of a raw polymer versus Mooney viscosity of the fully compounded rubber compound made from said polymer.

PREFERRED EMBODIMENT FOR CARRYING OUT THE INVENTION

As is known in the art, vulcanizable rubber articles such as tires and their treads comprise 100 parts of a vulcanizable rubber and a plurality of non-rubber components, e.g., fillers, curatives, accelerators, stabilizers, antioxidants, processing aids and the like. The rubber component or raw polymer can be natural, i.e., natural rubber, or synthetic, i.e., synthetic polyisoprene, styrene-butadiene rubber (SBR), other diene-containing polymers and copolymers and mixtures thereof. Processability of the rubber composition or stock is a factor both during compounding of the raw polymer with the other components as well as during subsequent stages such as calendering of the stock. Good processability requires that the stock be neither too tacky, or it will stick to the equipment, nor too boardy that is, stiff, or it will not mix or calender smoothly.

The process of the present invention requires that two measurements be made on the raw polymer. These include a determination of the Mooney viscosity and then of the relaxation time $T_{80}$ defined hereinbelow. The Mooney viscosity is reported as ML/4 at a specified temperature, where 4 designates the time in minutes and the temperature is degrees Farenheit. The measurement is made by embedding a large rotor disc between two plates of rubber which are secured within a heated mold. The rubber is thus held stationary and the rotor is rotated while the resulting torque is graphed in arbitrary Mooney units. The torque is relatively high during the first minute and then decreases as the temperature of the rubber is elevated and the latter becomes more fluid. After four minutes, the motor driving the rotor is turned off and the rubber slowly returns to the resting position, that is, it untwists while the torque decays. The time in seconds that is necessary for it to achieve an 80 percent return is known as the $T_{80}$ or relaxation time.

The present invention finds particular utility with rubber compositions comprising one or more synthetic elastomers. When synthetic rubbers are employed, physical properties vary and processing and manufacturing problems can result. As one example, viscosity control is important in the manufacture of tread stock. If the rubber composition has too low a viscosity, the tread will be wider; if it is too high, the tread will be narrower.

Because variations in the properties, particularly Mooney viscosity, of a raw polymer will lead to dimensional variations in the rubber article, e.g., tire component, the method of this invention provides a quality control. If, for instance, the Mooney viscosity of a particular raw polymer is not within acceptable limits, the variations in the article would be unacceptable and the polymer can be pulled from the manufacturing process.

As noted hereinabove, the operator ascertains the Mooney viscosity, $MV_a$ and $T_{80}$ for the raw polymer and from this information, with the aid of a computer, the Mooney viscosity $MV_b$ for the final rubber compound can be determined in advance. If the final Mooney $MV_b$ is not satisfactory, then a raw polymer of different properties can be selected or the processing additive level can be appropriately adjusted so that the final Mooney will be acceptable.

If for instance a rubber composition containing 100 parts of SBR as the raw polymer is to be compounded, the foregoing relationship is found to fit a second order equation where $MV_b$ is determined as follows:

$$MV_b = a_o + a_1 x_1 + a_2 x_2 + a_{11} x_1^2 + a_{22} x_2^2 + a_{12} x_1 x_2$$

where
$MV_b$ = ML/4 @212° F. of the final compound at 0.085 KWH/lb of mixing energy
$x_1$ = $T_{80}$ of SBR
$x_2$ = ML/4 @212° F. of SBR ($MV_a$)
$a_o$ = $-83.48$
$a_1$ = $5.34$
$a_2$ = $4.11$
$a_{11}$ = $0.026$
$a_{22}$ = $-0.01$
$a_{12}$ = $-0.15$.

Generally, where the $T_{80}$ of SBR ($x_1$) ranges between about six to 18 seconds and the ML/4 @212° F. of SBR ($x_2$) ranges between about 42 to 48 an acceptable $MV_b$ range will result, i.e., on the order of about 65 to 75.

As an example, a SBR stock, designated compound A, has been set forth in Table I comprising 100 parts of SBR and other components which are present as parts per hundred parts rubber (phr). The SBR utilized was Duradene 750, a synthetic styrene butadiene rubber from Firestone Tire & Rubber Company containing 18 percent bound styrene.

TABLE I

| SBR Stock | |
|---|---|
| Compounding Ingredients | Stock A |
| SBR | 100 |
| HAF carbon black | 65 |
| Zinc Oxide | 3.0 |
| Stearic Acid | 2.0 |
| Santoflex 13[b] | 2.0 |
| Wax | 3.0 |
| Process Oil | 37.5 |
| Sulfur | 2.0 |

TABLE I-continued

| SBR Stock | |
|---|---|
| Compounding Ingredients | Stock A |
| Santocure NS[c] | 1.0 |

[a]Solution
[b]N—(1,3-dimethylbutyl)-N'—phenyl-paraphenylene diamine
[c]N—tert-butyl-2-benzothiazolesulfenamide It is to be understood that the foregoing composition Stock A, as well as the properties of the SBR selected do not constitute limitations of the present invention inasmuch as the method is applicable to other rubber stocks containing at least about 60 and up to 100 percent synthetic rubber, other amounts of carbon black, e.g., about 45 to 75 phr, other additives and amounts thereof.

The Mooney viscosity $MV_a$, and $T_{80}$ values for the SBR were 43.9 and 13.7, respectively. According to the equation, the calculated final Mooney $MV_b$ of Stock A should be 65.6. $MV_b$ as actually measured for Stock A was found to be 62.6.

With reference now to the drawing, the relationship of varying $T_{80}$ values for SBR and the Mooney viscosity of the rubber compound is demonstrated. Four SBR, raw polymers having a Mooney of 50 are depicted along the x-axis with their corresponding $T_{80}$ values ranging between 17.5 and 10. The final Mooney viscosity of the rubber compound ($MV_b$) is plotted along the y-axis and ranges from 66.9 to 78 as the $T_{80}$ is lowered, that is, it is inversely proportional to the decrease in $T_{80}$ for SBR.

Based upon the foregoing results in the example and drawing FIGURE, it can be seen that by determining the $T_{80}$ for a raw polymer, the Mooney viscosity for the compounded rubber stock can be determined in advance. Of course, it is to be understood that the process of the present invention is applicable to all rubber stocks containing synthetic rubber as the raw polymer not just SBR. Thus, it should be apparent to those skilled in the art that practice of the process can be determined without departing from the spirit of the invention herein disclosed and described, the scope of the invention being limited solely by the attached claims.

I claim:

1. A method for obtaining a vulcanizable rubber formulation of controlled uniform viscosity properties in the uncured state containing synthetic rubber comprising the steps of:
   determining the Mooney viscosity, $MV_a$ of the synthetic rubber from which the vulcanizable rubber formulation is to be prepared;
   determining the relaxation time, $T_{80}$, of the synthetic rubber from which the vulcanizable rubber formulation is to be prepared;
   calculating from $MV_a$ and $T_{80}$ the Mooney viscosity, $MV_b$, of the vulcanizable rubber formulation which is to be prepared from said synthetic rubber;
   selecting those synthetic rubbers having $MV_a$ and $T_{80}$ values within a predetermined range of values calculated to produce a vulcanizable rubber formulation compounded with said synthetic rubbers, the $MV_b$ of which is within a desired, preselected uniform range; and
   compounding said selected synthetic rubber with carbon black and other conventional rubber compounding agents to produce the vulcanizable rubber formulation of $MV_b$ within said predetermined range of values.

2. A method, as sert forth in claim 1, wherein said vulcanizable rubber formulation comprises from about 60 to 100 parts of said synthetic rubber.

3. A method, as set forth in claim 2, wherein said vulcanizable rubber is styrene-butadiene rubber.

4. A method, as set forth in claim 3, wherein said vulcanizable rubber formulation contains 100 parts of styrene-butadiene rubber.

5. A method, as set forth in claim 4, wherein said step of calculating the Mooney viscosity, $MV_b$, of said vulcanizable rubber formulation is according to the expression:

$$MV_b = a_0 + a_1 x_1 + a_2 x_2 + a_{11} x_1^2 + a_{22} x_2^2 + a_{12} x_1 x_2$$

where $MV_b = ML/4$ @212° F. of the final compound at 0.085 KWH/lb of mixing energy
$x_1 = T_{80}$ of SBR
$x_2 = ML/4$ @212° F. of SBR ($MV_{az}$)
$a_0 = -83.48$
$a_1 = 5.34$
$a_2 = 4.11$
$a_{11} = 0.026$
$a_{22} = -0.01$
$a_{12} = 0.15$.

6. A method, as set forth in claim 5, wherein $MV_a$ ranges from about 40 to 60.

7. A method, as set forth in claim 5, wherein $T_{80}$ ranges from about six to 30 seconds.

8. A method, as set forth in claim 5, wherein $MV_b$ ranges from about 60 to 65.

9. A method, as set forth in claim 3, wherein said styrene-butadiene rubber contains 18 percent bound styrene.

10. A method, as set forth in claim 9, wherein $MV_a$ ranges from about 40 to about 60.

11. A method, as set forth in claim 9, wherein $T_{80}$ ranges from about six to about 30.

12. A method, as set forth in claim 9, wherein $MV_b$ ranges from about 60 to 65.

* * * * *

UNITED STATES PATENT AND TRADEMARK OFFICE
CERTIFICATE OF CORRECTION

PATENT NO. : 4,792,908
DATED : December 20, 1988
INVENTOR(S) : Brantley, Jr.

It is certified that error appears in the above-identified patent and that said Letters Patent is hereby corrected as shown below:

Column 2, line 10

"$MV_b,$" should be -- $MV_a,$ --

Column 2, line 16

"212;20 F." should be -- 212° F. --

Column 4, line 39

"apparentto" should be -- apparent to --

Column 5, line 20

"$(MV_{az})$" should be -- $(MV_a)$ --

Signed and Sealed this

Eleventh Day of July, 1989

*Attest:*

DONALD J. QUIGG

*Attesting Officer*   *Commissioner of Patents and Trademarks*